United States Patent

Kojima et al.

[11] Patent Number: 5,604,035
[45] Date of Patent: Feb. 18, 1997

[54] PRESSURE-SENSITIVE ADHESIVE COMPOSITION AND PRESSURE-SENSITIVE ADHESIVE SHEETS USING THE COMPOSITION

[75] Inventors: Makoto Kojima; Masayuki Satake; Katsuhide Kojima; Tetsuo Omata; Eiichiro Fukusaki, all of Osaka, Japan

[73] Assignee: Nitto Denko Corporation, Osaka, Japan

[21] Appl. No.: 536,741

[22] Filed: Sep. 29, 1995

[30] Foreign Application Priority Data

Sep. 30, 1994 [JP] Japan ................... 6-237316

[51] Int. Cl.$^6$ .................... C09J 133/06; C09J 133/14; C09J 7/02; C08F 220/28
[52] U.S. Cl. .................... 428/355 AC; 526/320; 428/343
[58] Field of Search ............... 526/320; 428/355, 428/343

[56] References Cited

U.S. PATENT DOCUMENTS

| | | | |
|---|---|---|---|
| 4,569,977 | 2/1986 | Werber | 526/320 X |
| 4,925,908 | 5/1990 | Bernard et al. | 526/320 |
| 5,274,063 | 12/1993 | Matsumoto et al. | 526/320 |
| 5,326,644 | 7/1994 | Scholz et al. | 526/320 X |

*Primary Examiner*—Daniel Zirker
*Attorney, Agent, or Firm*—Sughrue, Mion, Zinn, Macpeak & Seas

[57] ABSTRACT

A pressure-sensitive adhesive composition showing the adhesive force and the cohesive force with a good stability is disclosed. The composition comprises a copolymer of a (meth)acrylic acid alkyl ester (a) having an alkyl group having from 2 to 14 carbon atoms and a (meth)acrylic acid alkyl ester (b) having a carboxyl group or a hydroxyl group at the terminal end and having an alkyl group having from 3 to 14 total carbon atoms as the ester side chain. In particular, when the carbon atom number of the alkyl group of the monomer (b) is less by one than or not less than the same number as the carbon atom number of the alkyl group of the monomer (a), the effect of the functional group can be most effectively exhibited. A pressure-sensitive adhesive tape or sheet is also disclosed, comprising a support having formed at least one surface thereof the pressure-sensitive adhesive layer comprising the pressure-sensitive adhesive composition.

6 Claims, No Drawings

PRESSURE-SENSITIVE ADHESIVE COMPOSITION AND PRESSURE-SENSITIVE ADHESIVE SHEETS USING THE COMPOSITION

FIELD OF THE INVENTION

The present invention relates to a pressure-sensitive adhesive composition and pressure-sensitive adhesive sheets such as a pressure-sensitive adhesive tape, a pressure-sensitive adhesive sheet, etc., using the composition. More specifically, the invention relates to a pressure-sensitive adhesive composition capable of maximally utilizing the effect of a functional group at the terminal of a monomer used for obtaining the pressure-sensitive adhesive composition and pressure-sensitive adhesive sheets.

BACKGROUND OF THE INVENTION

Hitherto, pressure-sensitive adhesive tapes and pressure-sensitive adhesive sheets (hereinafter referred to as "pressure-sensitive adhesive sheets") each comprising a support such as a paper, a plastic film, etc., having formed on one surface or both surfaces thereof a pressure-sensitive adhesive layer are widely used for various purposes of use. Also, there are many kinds of pressure-sensitive adhesive compositions for forming the pressure-sensitive adhesive layers according to the purposes of use thereof. Natural rubber type compositions, synthetic rubber type compositions, acrylic compositions, vinyl ether type compositions, silicone type compositions, etc., are generally used. Of these pressure-sensitive adhesives, an acrylic pressure-sensitive adhesive is excellent in the pressure-sensitive adhesive properties such as an adhesive force, a tack, a cohesive force, etc., and the durability such as a weather resistance, a solvent resistance, a heat resistance, etc. Therefore, the acrylic pressure-sensitive adhesive is one of the representative pressure-sensitive adhesives.

The acrylic pressure-sensitive adhesive is generally prepared by copolymerizing a (meth)acrylic acid alkyl ester having a low glass transition temperature as the main component monomer with a copolymerizable monomer such as a monomer having a functional group in order to impart a pressure-sensitive adhesive property. However, the acrylic pressure-sensitive adhesives involve various problems: the insufficiency in the cohesive force such that a cohesive slippage and fail are liable to occur where receiving stress over a long period of time even if the stress is small; the deficiency in the adhesive properties at high temperature; the deviation of the adhesive force with the passage of time; and the like. Thus, the acrylic pressure-sensitive adhesives yet have many disadvantages to be improved according to the purposes of use.

Since the acrylic pressure-sensitive adhesives can be prepared by the copolymerization reaction as described above, the adhesiveness and the cohesiveness thereof can be relatively easily improved by copolymerizing the main component monomer with a polar comonomer having a functional group such as carboxyl group or a hydroxyl group or with a polyfunctional internal crosslinking comonomer such as a di(meth)acrylate, a glycidyl (meth)acrylate, etc.

However, when the main component monomer is copolymerized with such a polar comonomer, the glass transition temperature of the pressure-sensitive adhesive (copolymer) obtained rises, whereby the tackiness, in particular, the initial adhesiveness is liable to reduce. Furthermore, with the rise of the glass transition temperature of the pressure-sensitive adhesive, there is a possibility of deteriorating the adhesive properties at low temperature and hence there is a limit on the copolymerization ratio of such a polar comonomer. Also, for improving the cohesiveness of the pressure-sensitive adhesive by post-crosslinking, pressure-sensitive adhesive sheets are prepared by coating a solution of the copolymer and a crosslinking agent dissolved in an optional solvent followed by drying. However, when the functional group in the copolymer, which becomes the crosslinking point, is taken in the molecular chain of the copolymer, quick crosslinking reaction does not occur, and the crosslinking reaction proceeds gradually with the passage of time to change the adhesive properties. Accordingly, for obtaining pressure-sensitive adhesive sheets stable in the quality, a sufficient aging operation becomes necessary, which is undesirable from the point of the required productivity.

SUMMARY OF THE INVENTION

One object of the present invention is to overcome the problems in conventional acrylic pressure-sensitive adhesive compositions as described above and is to provide a pressure-sensitive adhesive composition showing excellent adhesive force and cohesive force with a good stability.

Another object of the present invention is to provide pressure-sensitive adhesive sheets using the pressure-sensitive adhesive composition.

As a result of various investigations to attain the above objects, it has been found that by using a functional (meth)acrylic acid alkyl ester mainly as a tackiness-imparting component and a functional (meth)acrylic acid alkyl ester having a specific side chain as a copolymerizable monomer, the functional group in the copolymer formed is effectively functioned and a pressure-sensitive adhesive composition excellent in the adhesiveness and the cohesiveness can be obtained. The present invention has been completed based on this finding.

According to one embodiment of the present invention, there is provided a pressure-sensitive adhesive composition comprising a copolymer of following monomer (a) and monomer (b) as essential components:

(a) from 20 to 99.95% by weight of a (meth)acrylic acid alkyl ester having an alkyl group having from 2 to 14 total carbon atoms as the ester side chain, and (b) from 0.05 to 80% by weight of a (meth)acrylic acid alkyl ester having a carboxyl group or a hydroxyl group at the terminal thereof and an alkyl group having from 3 to 14 total carbon atoms as the ester side chain.

In particular, in the above requirement, when each of the alkyl group of the monomer (a) and the alkyl group of the monomer (b) is a straight chain alkyl group, it is preferred that the carbon atom number of the monomer (b) is less by one than or not less than the same number as the carbon atom number of the alkyl group of the monomer (a).

Also, when at least one of the alkyl group of the monomer (a) and the alkyl group of the monomer (b) is a branched chain alkyl group, it is preferred that the carbon atom number of the alkyl straight chain having the functional group of the monomer (b) is less by one than or not less than the same number as the carbon atom number of the longest alkyl straight chain of the alkyl group of the monomer (a).

According to another embodiment of the present invention, there is provided pressure-sensitive adhesive sheets comprising a support having formed at least one surface thereof a pressure-sensitive adhesive layer formed by the above-described pressure-sensitive adhesive composition.

DETAILED DESCRIPTION OF THE INVENTION

The present invention is described in detail below.

The monomer (a) which is used in the pressure-sensitive composition of the present invention is a (meth)acrylic acid alkyl ester having an alkyl group having from 2 to 14 total carbon atoms as the ester side chain, and is a component which mainly imparts the pressure-sensitive adhesive properties to the composition obtained. It is necessary in the monomer (a) that the total carbon atom number of the alkyl group as the ester side chain is from 2 to 14 from the points of the initial adhesiveness, the tackiness, and the adhesiveness.

Examples of the monomer (a) include a (meth)acrylic acid ethyl ester, a (meth)acrylic acid propyl ester, a (meth)acrylic acid butyl ester, a (meth)acrylic acid pentyl ester, a (meth)acrylic acid hexyl ester, a (meth)acrylic acid heptyl ester, a (meth)acrylic acid octyl ester, a (meth)acrylic acid nonyl ester, a (meth)acrylic acid decyl ester, a (meth)acrylic acid undecyl ester, a (meth)acrylic acid dodecyl ester, a (meth)acrylic acid tridecyl ester, and a (meth)acrylic acid tetradecyl ester. These esters may be straight chain esters or branched chain esters as structural isomers. These esters can be used alone or as a mixture of them.

From the point of the properties as the pressure-sensitive adhesive, the monomer (a) is copolymerized in an amount of from 20 to 99.95% by weight, and preferably from 30 to 99.95% by weight, based on the weight of the total monomers as the essential component.

On the other hand, the monomer (b) used is a (meth)acrylic acid alkyl ester having a carboxyl group or a hydroxyl group at the terminal thereof and having an alkyl group having from 3 to 14 total carbon atoms as the ester side chain. The monomer (b) has an alkyl group as the ester side chain as in the monomer (a), and has a carboxyl group or a hydroxyl group as a functional group at the terminal end of the side chain thereof. The polarity increased by the terminal functional group of the monomer (b) improves the adhesive properties such as the adhesiveness and the cohesiveness. Further, a methylene chain of the monomer (b) between an acryloyl group and the functional group at the terminal acts as a spacer to impart a degree of freedom to the main chain of the copolymer, thereby exhibiting the effect of relaxing the rise of the glass transition temperature of the copolymer. Furthermore, by using an alkyl group having from 3 to 14 total carbon atoms as the ester side chain of the copolymer and preferably employing the alkyl group having the total carbon atoms more than the total carbon atoms of the alkyl group in the monomer (a), the functional group is prevented from being taken in the copolymer chain, whereby the effect of the functional group can be effectively utilized.

To obtain the above effect, in particular, the effect of giving an appropriate degree of freedom to the main chain of the copolymer, it is necessary that the total carbon atoms of the alkyl group in the monomer (b) is at least 3. If the total carbon atoms of the alkyl group is over 14, the ester side chain is too long, whereby there are possibilities that the phenomenon of taking the functional group at the terminal of the side chain in the inside of the copolymer chain occurs, and tackiness decreases.

Examples of the monomer (b) include a (meth)acrylic acid 3-carboxypropyl ester, a (meth)acrylic acid 4-carboxybutyl ester, a (meth)acrylic acid 5-carboxypentyl ester, a (meth)acrylic acid 6-carboxyhexyl ester, a (meth)acrylic acid 3-hydroxypropyl ester, a (meth)acrylic acid 2-methyl-3-hydroxypropyl ester, a (meth)acrylic acid 4-hydroxybutyl ester, a (meth)acrylic acid 6-hydroxyhexyl ester, and a (meth)acrylic acid 8-hydroxyoctyl ester. These esters can be used alone or as a mixture of them.

The monomer (b) is copolymerized in an amount of from 0.05 to 80% by weight, and preferably from 0.05 to 70% by weight, based on the weight of the total monomers as the essential component. If the amount of the monomer (b) is less than 0.05% by weight, the effect of the functional group contained in the monomer (b) cannot sufficiently be obtained, and if the amount thereof is over 80% by weight, the amount of the monomer (a) copolymerized becomes less, whereby the adhesive properties as the pressure-sensitive adhesive, such as the initial tackiness, etc., are undesirably decreased. The copolymerization range of the monomer (b) is relatively wide, but when the functional group plays as the crosslinking point, the amount of the monomer (b) copolymerized can be reduced in the above-described range. However, when the functional group does not play as the crosslinking point but is functioned for aiming at the improvement of the cohesive force of the pressure-sensitive adhesive obtained, the amount of the monomer (b) copolymerized can be increased. Thus, the amount of the monomer (b) is defined in the range described above.

In the pressure-sensitive adhesive composition of the present invention, it is preferable that the monomer (a) and monomer (b) which are copolymerized as the essential components have the following relationship.

(1) When each of the alkyl group of the monomer (a) and the alkyl group of the monomer (b) is a straight chain alkyl group, the carbon atom number of the alkyl group of the monomer (b) is less by one than or not less than the same number as the carbon atom number of the alkyl group of the monomer (a).

(2) When at least one of the alkyl group of the monomer (a) and the alkyl group of the monomer (b) is a branched chain alkyl group, the carbon atom number of the alkyl straight chain having the functional group of the monomer (b) is less by one than or not less than the same number as the carbon atom number of the longest alkyl straight chain of the alkyl group of the monomer (a).

That is, when the monomer (a) and the monomer (b) satisfy the relationship (1) or (2) described above, since the functional group which exists at the terminal of the monomer (b) hangs at the side chain with a long methylene chain as a spacer, the amount of the functional group taken in the inside of the molecular chain of the copolymer is reduced, and hence the effect that the functional group inherently possesses for a polarization or as a crosslinking point can be effectively obtained.

In the pressure-sensitive adhesive composition of the present invention, other copolymerizable monomer (c) can be copolymerized in addition to the monomers (a) and (b) described above. By using such a copolymerizable monomer (c), the desired properties corresponding to the purposes of use can be imparted to the pressure-sensitive adhesive composition obtained. For example, the polarity of the composition can be increased, the hydrophilic property thereof can be improved, and the adhesiveness can be improved.

Examples of such a copolymerizable monomer (c) include carboxyl group-containing monomers such as (meth)acrylic acid, maleic acid, maleic anhydride, itaconic acid, crotonic acid, carboxyethyl (meth)acrylate, etc.; sulfoxyl group-containing monomers such as 2-acrylamido-2-methylpropane sulfonic acid, etc.; phosphoxyl group-containing monomers such as 2-hydroxyethylacryloyl phosphate, 2-hydroxypropylacryloyl phosphate, etc.; amide type monomers such as (meth)acrylamide, N-substituted (meth)acrylamide, 3-acryloyloxypropylamide, 4-acryloyloxybutylamide, 5-acryloyloxypentylamide, 4-acryloyloxyhexylamide, N-methyl-3-acryloyloxypropylamide, N,N-dimethyl-3-acryloyloxypropylamide, N-vinyl-2-pyrrolidone, N-vinylcarboxylic acid amide, etc.; vinyl type monomers such as vinyl acetate, styrene, α-methylstyrene, etc.; and functional group-containing (meth)acrylates such as glycidyl (meth)acrylate, 2-hydroxyethyl (meth)acrylate, 2-hydroxypropyl (meth)acrylate, methyl (meth)acrylate, tetrahydrofurfuryl (meth)acrylate, polyethylene glycol (meth)acrylate, polypropylene glycol (meth)acrylate, 1-acetoxy-4-acryloyloxypentane, 6-acryloyloxyethylhexanoate, fluorine-containing (meth)acrylate, silicon-containing (meth)acrylate, etc.

Polyfunctional monomers for internal crosslinking, such as hexanediol di(meth)acrylate, (poly)ethylene glycol di(meth)acrylate, (poly)propylene glycol di(meth)acrylate, neopentyl glycol di(meth)acrylate, pentaerythritol tri-(meth)acrylate, dipentaerythritol hexa(meth)acrylate, etc.; polyester (meth)acrylate; urethane (meth)acrylate; etc., can also be used as the monomer (c).

In the copolymerizable monomer (c), by selecting the monomer (c) such that the monomer has the same relationship of the side-chain alkyl groups as in the monomer (a) and the monomer (b) in the present invention, the effect of the functional group in the copolymerizable monomer (c) can most effectively be exhibited.

The copolymerizable monomer (c) can be copolymerized in an amount of 30% by weight or less, and preferably 25% by weight or less, based on the weight of the total monomers such that the properties of the monomer (a) and the monomer (b) described above are not hindered. The monomer (c) can be used alone or as a mixture of them.

The pressure-sensitive adhesive composition of the present invention is prepared by copolymerizing the monomer (a) and the monomer (b) described above as the essential components together with, if necessary, the monomer (c), and there is no particular restriction on the polymerization method. Conventional polymerization methods such as a solution polymerization method, a bulk polymerization method, a suspension polymerization method, etc., can be employed. When the bulk polymerization method which is a solventless polymerization method is employed, it is preferred to perform the polymerization by irradiating radiations such as ultraviolet rays, etc., from the point of controlling the reaction.

The polymerization uses a polymerization initiator, and an azo type or peroxide type thermal polymerization initiator, an acetophenone type, benzoin ether type, or ketal type photopolymerization initiator, etc., can be used.

The pressure-sensitive adhesive composition of the present invention can, if required and necessary, contain various additives, e.g., various fillers such as glass fibers, glass beads, metal powders, inorganic powders, etc.; tackifier resins such as natural resins, synthetic resins, etc.; fats and oils, surfactants, pigments, and coloring agents in an amount of 200 parts by weight or less per 100 parts by weight of the copolymer.

Pressure-sensitive adhesive sheets such as a pressure-sensitive adhesive tape and a pressure-sensitive adhesive sheet can be prepared by forming in layer the pressure-sensitive adhesive composition of the present invention on at least one surface of a support such as a plastic film or sheet, a paper, a cloth, a nonwoven fabric, a foam film or sheet, a metal foil, or a laminate thereof at a build of from about 5 to 2,000 μm. The pressure-sensitive adhesive sheets of the present invention can be coated with a conventional releasing agent such as a silicone type resin, a fluorine type resin, etc., on the back surface of the support thereof and wound in a roll form, or the pressure-sensitive adhesive sheets can be treated such that the exposed surface of the pressure-sensitive adhesive layer formed can be covered with a separator coated with a conventional releasing agent.

A crosslinking treatment can be applied to the pressure-sensitive adhesive layer of the pressure-sensitive adhesive sheets of the present invention in addition to imparting the crosslinking point or improving the cohesive force thereof with the monomer (b). The crosslinking treatment which can be used includes copolymerization with an internal crosslinking monomer such as a polyfunctional (meth)acrylate exemplified as the monomer (c), and addition of a melamine resin, an isocyanate compound, an epoxy compound, an aziridine type compound, a peroxide, a metal chelate compound, etc., as an external crosslinking agent to the copolymer, followed by heating the mixture. In place of the above crosslinking method, a method of crosslinking by irradiating with activating rays such as electron rays, ultraviolet rays, etc., can be employed.

By applying the above crosslinking treatment, the internal cohesive force of the pressure-sensitive adhesive layer in the pressure-sensitive adhesive sheets of the present invention is improved, and the pressure-sensitive adhesive layer shows excellent adhesive properties. The degree of crosslinking can appropriately be controlled according to the purpose of use. For example, it is preferred to control the degree of crosslinking such that the gel content is from 20 to 95% for adhesion and from 60 to 100% for removal. The gel content means the proportion of the pressure-sensitive adhesive (residue) which remained without being dissolved after immersing the pressure-sensitive adhesive layer in ethyl acetate at room temperature for one week.

The present invention is explained in more detail by reference to the following Examples and Comparative Examples, but it should be understood that the invention is not construed as being limited thereto. Unless otherwise indicated, all parts, percents, ratios and the like are by weight.

EXAMPLE 1

In a polymerization reaction vessel were placed 150 parts of ethyl acetate, 95 parts of n-butyl acrylate, 5 parts of 5-carboxypentyl acrylate, and 0.5 part of azobisisobutyronitrile as a polymerization initiator, and polymerization reaction was carried out in an inert gas atmosphere at 60° C. for 4 hours and then at 80° C. for 2 hours to prepare a copolymer solution (conversion about 99%).

5 Parts of a trimethylolpropane-tolylene diisocyanate adduct as a crosslinking agent was added to 100 parts of the solid content of the copolymer solution obtained to prepare a solution of a pressure-sensitive adhesive composition of the present invention.

The solution was coated on a 25 μm thick polyester film at a build of 50 μm after drying and dried at 120° C. for 5 minutes to prepare a pressure-sensitive adhesive sheet having a crosslinked pressure-sensitive adhesive layer.

EXAMPLE 2

By following the same procedure as in Example 1 except that 75 parts of n-butyl acrylate and 25 parts of 5-carboxypentyl acrylate were used, a copolymer solution (conversion about 99%) was prepared. Further, by adding thereto the same crosslinking agent as used in Example 1, a pressure-sensitive adhesive sheet was prepared in the same manner as in Example 1.

EXAMPLE 3

By following the same procedure as in Example 1 except that 40 parts of n-butyl acrylate and 60 parts of 5-carboxypentyl acrylate were used, a copolymer solution (conversion about 99%) was prepared. Further, by adding thereto the same crosslinking agent as used in Example 1, a pressure-sensitive adhesive sheet was prepared in the same manner as in Example 1.

COMPARATIVE EXAMPLE 1

By following the same procedure as in Example 1 except that 95 parts of n-butyl acrylate was used and 5 parts of acrylic acid was used in place of 5-carboxypentyl acrylate, a copolymer solution (conversion about 99%) was prepared. Further, by adding the same crosslinking agent as used in Example 1, a pressure-sensitive adhesive sheet was prepared in the same manner as in Example 1.

COMPARATIVE EXAMPLE 2

By following the same procedure as in Example 1 except that 90 parts of n-butyl acrylate was used and 10 parts of acrylic acid was used in place of 5-carboxypentyl acrylate, a copolymer solution (conversion about 99%) was prepared. Further, by adding the same crosslinking agent as used in Example 1, a pressure-sensitive adhesive sheet was prepared in the same manner as in Example 1.

COMPARATIVE EXAMPLE 3

By following the same procedure as in Example 1 except that 75 parts of n-butyl acrylate was used and 25 parts of acrylic acid was used in place of 5-carboxypentyl acrylate, a copolymer solution (conversion about 99%) was prepared. Further, by adding the same crosslinking agent as used in Example 1, a pressure-sensitive adhesive sheet was prepared in the same manner as in Example 1.

The following properties were measured on the pressure-sensitive adhesive sheets obtained in Examples 1 to 3 and Comparative Examples 1 to 3. The results obtained are shown in Table 1 below.

Tack

The tack was measured by a finger touch tack. The grade "poor" in Table 1 shows the state that the sheet scarcely shows tack by a finger touch and the sheet cannot temporarily be fixed (no time to fix).

Initial Adhesive Force

Each of the pressure-sensitive adhesive sheets obtained in the Examples and the Comparative Examples was cut in 20 mm width, and the sheet thus cut was adhered to a SUS-304 plate the surface of which was polished with a sand paper (#280). After press-adhering the sheet to the plate by reciprocating once a 2 kg roller, the adhered sample was allowed to stand for 20 minutes. The sample was then subjected to a 180° peeling test using a tensile tester at a rate of 300 mm/minute according to JIS-Z-0237, and the peeling adhesive force was measured.

Adhesive Force With Aging

The same sample as used in the above initial adhesive force test was stored in a thermostatic chamber at 50° C. a day, and the same peeling test as the initial adhesive force test was then applied.

Resistance in Water

After immersing the same sample as used in the above initial adhesive force test in water at room temperature for 3 days, the sample was subjected to the 180° peeling test using the tensile tester at a rate of 300 mm/minute, and the adhesive force was measured.

TABLE 1

|  | Tack | Initial Adhesive Force (g/20 mm width) | Adhesive Force With Aging (g/20 mm width) | Resistance in Water (g/20 mm width) |
| --- | --- | --- | --- | --- |
| Example 1 | Good | 900 | 1,400 | 600 |
| Example 2 | Good | 950 | 1,500 | 600 |
| Example 3 | Good | 900 | 2,500 | 400 |
| Comparative Example 1 | Good | 700 | 1,100 | 500 |
| Comparative Example 2 | Poor | 700 | 1,500 | 400 |
| Comparative Example 3 | Poor | — | 3,800 | — |

(—): The initial adhesive force was scarcely detected.

It is clear from Table 1 above that the samples obtained in the Examples have good initial adhesive force, and even when the amount of 5-carboxypentyl acrylate copolymerized increases, the initial adhesive force does not lower. On the other hand, it can be seen from Table 1 that in the samples obtained in the Comparative Examples, the tack and the initial adhesive force decrease with the increase of the amount of acrylic acid copolymerized having no methylene spacer.

Regarding the adhesive force with time wherein aging at 50° C. for one day was conducted, the samples obtained in the Examples and the Comparative Examples show a tendency of increase, and the samples obtained in the Comparative Examples also show a sufficient adhesive force. However, since the samples obtained in the Comparative Examples are insufficient in the tack, these samples cannot temporarily be fixed and are not suitable for practical use. This is considered to be that in the pressure-sensitive compositions of the present invention, the cohesiveness is improved and also the methylene spaces can prevent from increasing deterioration of the glass transition temperature.

However, regarding the water resistance test, even the samples obtained in the Examples show the tendency that the properties for practical use are gradually unbalanced when the amount of the copolymerizable component is too excess.

EXAMPLE 4

In a polymerization reaction vessel were placed 150 parts of ethyl acetate, 99.9 parts of n-butyl acrylate, 0.1 part of 6-hydroxyhexyl acrylate, and 0.5 part of azobisisobutyronitrile as a polymerization initiator, and the polymerization reaction was carried out in an inert gas atmosphere at 60° C. for 4 hours and then at 80° C. for 2 hours to prepare a copolymer solution (conversion about 99%).

By adding 0.1 part of a trimethylolpropane-tolylene diisocyanate adduct as a crosslinking agent to 100 parts of the solid content of the copolymer solution obtained, a solution of a pressure-sensitive adhesive of the present invention was prepared.

The solution was coated on a 25 μm thick polyester film at a build of 50 μm after drying and dried at 120° C. for 5 minutes to prepare a pressure-sensitive adhesive sheet having a crosslinked pressure-sensitive adhesive layer. Separately, a pressure-sensitive adhesive layer was formed on a releasing paper in the same manner as above.

EXAMPLE 5

By following the same procedure as in Example 4 except that 99.8 parts of n-butyl acrylate and 0.2 part of 6-hydroxyhexyl acrylate were used, a copolymer solution (conversion about 99%) was prepared. Further, by adding thereto the same crosslinking agent as used in Example 4, a pressure-sensitive adhesive sheet was prepared in the same manner as in Example 4.

EXAMPLE 6

By following the same procedure as in Example 4 except that 99.5 parts of n-butyl acrylate and 0.5 part of 6-hydroxyhexyl acrylate were used, a copolymer solution (conversion about 99%) was prepared. Further, by adding thereto the same crosslinking agent as used in Example 4, a pressure-sensitive adhesive sheet was prepared in the same manner as in Example 4.

COMPARATIVE EXAMPLE 4

By following the same procedure as in Example 4 except that 2-hydroxyethyl acrylate was used in place of 6-hydroxyhexyl acrylate, a copolymer solution (conversion about 99%) was prepared. Further, by adding thereto the same crosslinking agent as used in Example 4, a pressure-sensitive adhesive sheet was prepared in the same manner as Example 4.

COMPARATIVE EXAMPLE 5

By following the same procedure as in Example 5 except that 2-hydroxyethyl acrylate was used in place of 6-hydroxyhexyl acrylate, a copolymer solution (conversion about 99%) was prepared. Further, by adding thereto the same crosslinking agent as used in Example 5, a pressure-sensitive adhesive sheet was prepared in the same manner as Example 5.

COMPARATIVE EXAMPLE 6

By following the same procedure as in Example 6 except that 2-hydroxyethyl acrylate was used in place of 6-hydroxyhexyl acrylate, a copolymer solution (conversion about 99%) was prepared. Further, by adding thereto the same crosslinking agent as used in Example 6, a pressure-sensitive adhesive sheet was prepared in the same manner as in Example 6.

The following properties were measured on each of the pressure-sensitive adhesive sheets obtained in Examples 4 to 6 and Comparative Examples 4 to 6, and the results obtained are shown in Table 2 below.

Holding Force

After aging each of the pressure-sensitive adhesive sheets obtained in the Examples and the Comparative Examples at 50° C. for 7 days, the sheet was adhered to a bakelite plate at an area of 20 mm ×10 mm. After press-adhering the sheet to the plate by reciprocating once with a 2 kg roller, the adhered sample was allowed to stand for 20 minutes. A weight of 500 g was hung to the end of the adhered sheet. After standing the sample under an atmosphere of 40° C., the lapsed time to hold the weight was measured. When the pressure-sensitive sheet did not fail even after one hour, the shear-slippage distance of the sheet after one hour was measured.

Gel Content

After aging the pressure-sensitive adhesive layer formed on the releasing paper in each of the samples obtained in the Examples and the Comparative Examples at 50° C. for 7 days, part of the pressure-sensitive adhesive layer was cut into a sample piece of 20 mm ×10 mm. The sample piece was placed in bag made of a polytetrafluoroethylene porous film having pore size of 0.2 μm, and the bag was immersed in ethyl acetate at room temperature for one week. The weight of the only bag was previously measured, the weight of the pressure-sensitive adhesive layer before the immersion and the dry weight of the sample after the immersion were measured, and the proportion of the undissolved components (gel content) in the pressure-sensitive adhesive layer was determined.

TABLE 2

| | Holding Force | | |
| --- | --- | --- | --- |
| | Time to Fail (min) | Slippage Distance (mm) | Gel Content (%) |
| Example 4 | — | 0.6 | 50 |
| Example 5 | — | 0.2 | 70 |
| Example 6 | — | 0.1 | 85 |
| Comparative Example 4 | 8 | — | 0 |
| Comparative Example 5 | 8 | — | 0 |
| Comparative Example 6 | — | — | 30 |

It is clear from Table 2 above that in the samples obtained in the Examples, sufficient crosslinking reaction occurs even in the copolymerization with a small amount of 6-hydroxyhexyl acrylate, and the samples show excellent adhesive properties (cohesiveness). On the other hand, in the samples obtained in the Comparative Examples, even when a stoichiometrically large amount of 2-hydroxyethyl acrylate is used, the crosslinking reaction is not sufficiently proceeded as compared with the samples obtained in the Examples, which results in making the cohesive force insufficient.

It is clear from the results of Table 1 and Table 2 that in the samples of the present invention, the alkyl group in the monomer (b) functions as a spacer and, therefore, the functional group at the terminal sufficiently shows the incorporation effect thereof.

EXAMPLES 7 TO 9

By following the same procedures as in Examples 4 to 6 except that iso-octyl acrylate was used in place of n-butyl acrylate, pressure-sensitive adhesive sheets were prepared, respectively.

The holding force and the gel content were measured on the pressure-sensitive adhesive sheets thus obtained in the same manners as described above. The results obtained are shown in Table 3 below.

TABLE 3

| | Holding Force | | |
| --- | --- | --- | --- |
| | Time to Fail (min) | Slippage Distance (mm) | Gel Content (%) |
| Example 7 | — | 0.3 | 67 |
| Example 8 | — | 0.8 | 50 |
| Example 9 | — | 0.1 | 78 |

EXAMPLE 10

By following the same procedure as in Example 3 except that the amount of 5-carboxypentyl acrylate was changed to 55 parts and 5 parts of acrylic acid was further added, a pressure-sensitive adhesive sheet was prepared.

EXAMPLE 11

By following the same procedure as in Example 2 except that the crosslinking agent was not added, a pressure-sensitive adhesive sheet was prepared.

The tack, the initial adhesive force, the adhesive force with aging, and the resistance in water were measured on the pressure-sensitive sheets thus obtained in the same manners as described above. The results obtained are shown in Table 4 below.

TABLE 4

| | Tack | Initial Adhesive Force (g/20 mm width) | Adhesive Force with Aging (g/20 mm width) | Resistance in Water (g/20 mm width) |
| --- | --- | --- | --- | --- |
| Example 10 | Good | 950 | 3,100 | 450 |
| Example 11 | Good | 1,200 | 1,100 | 600 |

As described above, the pressure-sensitive adhesive composition and the pressure-sensitive adhesive sheets using this pressure-sensitive adhesive composition of the present invention can most effectively show the effect of the functional group which exists in the combination with the specific monomer of the present invention and also show excellent pressure-sensitive adhesive properties such as the excellent cohesiveness, tackiness, adhesiveness, etc., which overcome the disadvantages of conventional acrylic pressure-sensitive adhesives.

While the invention has been described in detail and with reference to specific embodiments thereof, it will be apparent to one skilled in the art that various changes and modifications can be made therein without departing from the spirit and scope thereof.

What is claimed is:

1. A pressure-sensitive adhesive composition comprising a copolymer of the following monomer (a) and monomer (b) as the essential components:

(a) from 20 to 99.95% by weight of a (meth)acrylic acid alkyl ester having an alkyl group having from 2 to 14 total carbon atoms as the ester side chain, and (b) from 0.05 to 80% by weight of a (meth)acrylic acid alkyl ester having an alkyl group having from 3 to 14 total carbon atoms as the ester side chain and having a carboxyl group or a hydroxyl group at the terminal end of said side chain, and wherein the alkyl group of the monomer (a) and the alkyl group of the monomer (b) are each a straight chain alkyl group, with a carbon atom number of the alkyl group of the monomer (b) equal to less by one than, or not less than, a carbon atom number of the alkyl group of the monomer (a), or, wherein at least one of the alkyl group of the monomer (a) and the alkyl group of the monomer (b) is a branched chain alkyl group, with a carbon atom number of an alkyl straight chain having a functional group of the monomer (b) equal to less by one than, or not less than, a carbon atom number of a longest alkyl straight chain of the monomer (a).

2. The pressure-sensitive adhesive composition of claim 1, wherein a copolymerizable monomer (c), selected from the group consisting of carboxyl group-containing monomers, sulfoxyl group-containing monomers, phosphoxyl group-containing monomers, amide-containing monomers, vinyl-containing monomers, functional group-containing (meth)acrylates, and polyfunctional monomers, is further copolymerized with the monomer (a) and the monomer (b) in an amount of 30% by weight or less based on the weight of the total monomers.

3. A pressure-sensitive adhesive sheet comprising a support having formed on at least one surface thereof a pressure-sensitive adhesive layer obtained from the pressure-sensitive adhesive composition of claim 1.

4. The pressure-sensitive adhesive sheet of claim 3, wherein the pressure-sensitive adhesive layer is crosslinked.

5. The pressure-sensitive adhesive sheet of claim 4, wherein the crosslinking of the pressure-sensitive adhesive layer is applied to an extent such that the gel content is from 20 to 95% for adhesion.

6. The pressure-sensitive adhesive sheet of claim 4, wherein the crosslinking of the pressure-sensitive adhesive layer is applied to an extent such that the gel content is from 60 to 100%.

* * * * *